UNITED STATES PATENT OFFICE 2,394,848

PROCESS FOR THE PRODUCTION OF ALIPHATIC ALCOHOLS

Thomas F. Doumani, Wilmington, Calif., assignor to Union Oil Company of California, Los Angeles, Calif., a corporation of California No Drawing. Application August 25, 1941, Serial No. 408,215

6 Claims. (Cl. 260—632)

This invention deals with processes for producing certain ketone reduction products and related compounds.

More specifically, this invention relates to the production of some new derivatives of unsaturated ketones, including the saturated ketones, saturated alcohols, and the unsaturated alcohols thereof.

These new derivatives have valuable solvent properties, are useful chemical intermediates, and possess characteristic and distinctive odors which make them desirable as ingredients in perfumes.

When these unsaturated ketones are hydrogenated with molecular hydrogen in the presence of an active hydrogenation catalyst at temperatures from about 30° C. to 70° C., and pressures of about 150 to 750 pounds per square inch, the saturated ketones are obtained exclusively. Thus, in this process, molecular hydrogen is added to the double bond of the ethylenic linkage of the unsaturated ketones, without attacking the carbonyl group, as indicated by the following equations:

(1) 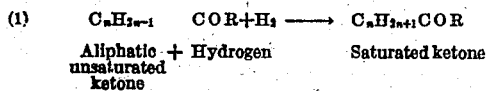

Aliphatic + Hydrogen         Saturated ketone
    unsaturated
    ketone (2) 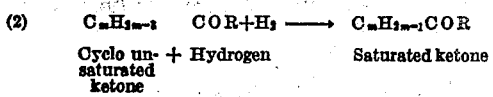

Cyclo un- + Hydrogen        Saturated ketone
    saturated
    ketone

In the previous equations $n$ and $m$ represent integers, $n$ having a value of 3 or higher and $m$ having a value of 5 or higher. R represents a hydrocarbon radical.

When the temperature is held at about 150° C. or slowly raised to about 150° C. and hydrogenation continued until absorption of hydrogen is complete, both the ethylenic linkage and the carbonyl group are attacked, as indicated by the following equations:

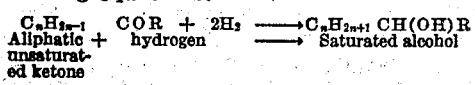

Aliphatic + hydrogen        Saturated alcohol
unsaturated
ketone

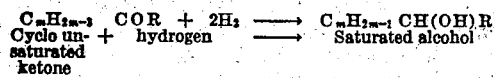

Cyclo un- + hydrogen       Saturated alcohol
saturated
ketone

Thus, in this process the unsaturated ketones are converted to the corresponding saturated alcohols.

Activated nickel catalysts such as those prepared from a nickel-aluminum alloy (Raney nickel, U. S. Patents Nos. 1,563,587; 1,628,190; 1,915,473) are particularly suitable as catalysts. Other catalysts such as active finely-divided platinum or copper, or mixed-metal catalysts can be used. The unsaturated ketone can be diluted with a suitable solvent, such as ethanol, and then hydrogenated. These hydrogenation products are filtered from the spent catalyst, and the product fractionated at atmospheric or reduced pressure. The products, so obtained, are colorless, and remain so indefinitely upon standing in daylight at room temperature.

Two methods are reported for the reduction of unsaturated ketones or aldehydes to the corresponding unsaturated alcohol. The first method (U. S. Patent No. 2,009,948) depends upon reaction with hydrogen in the presence of hydrogenation catalysts under mild specific reaction conditions such that the double bond (ethylene linkage) will not be hydrogenated. Although such mild catalysts from the group consisting of copper, zinc, or cadmium are used; nevertheless, the reaction product always contains some saturated compound. The second method for the reduction of the carbonyl to the carbinol group consists of treatment of the compound to be reduced with a metal alkoxide in the presence of an alcohol capable of oxidation. On a laboratory scale, an aluminum alkoxide and an alcohol have been used together to effect the reduction of various aldehydes and some ketones. The reaction proceeds according to the following equation:

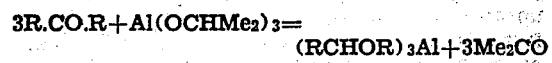

In attempting to prepare aluminum isopropoxide according to the method of Adkins (Journal of American Chemical Society, 44, 2178 (1922), using aluminum turnings prepared from commercial aluminum pipe, instead of pure aluminum turnings, difficulty was encountered. The amalgam formed from the aluminum turnings and aqueous mercuric chloride was found to lose mechanically much mercury when washed with water; consequently, unlike the previously cited investigator, it was found that this amalgam reacted very slowly with isopropanol. I have found that aluminum isopropoxide can be easily prepared by refluxing isopropanol and aluminum turnings from commercial pipe in the presence of a trace of an alcohol soluble mercury salt (e. g., mercuric chloride) until the aluminum metal has passed into solution. Unlike the findings of Lund (Ber., 70, 1522 (1927), I have found that this reaction is never as violent as he reports, provided aluminum turnings from commercial pipe are used. This is undoubtedly due to the impurities associated with the aluminum metal in the commercial pipe. A further advantage lies in the greater availability and economy of this aluminum. It is unnecessary to isolate the crude aluminum isopropoxide, prior to reaction with the ketone to be reduced.

According to the prior art, when unsaturated ketones or aldehydes are reduced to the corresponding unsaturated alcohols, according to the second method, the reaction is always carried out by refluxing the carbonyl compound with an aluminum alkoxide in an alcohol. Suitable reducing agents are aluminum ethoxide, aluminum isopropoxide, or aluminum tertiary butoxide. Simultaneous with the reduction of the unsaturated carbonyl containing compound to the corresponding alcohol, there is formed an equivalent amount of ketone (from the aluminum alkoxide) which is removed by fractionation as formed. I have found that it is disadvantageous to execute this reduction in the above manner owing to the formation of large amounts of side products. These deleterious side products are high boiling liquids formed by self-condensation of the ketones; the reducing agent acts as the condensing agent. I have now found that the amount of condensation can be greatly diminished and in some cases almost entirely eliminated by keeping the concentration of the reducing agent at a very small value during the reduction. I prefer to do this by adding the aluminum alkoxide dissolved in alcohol very slowly to the ketone in alcohol. The rate of addition should be so regulated that at all times the concentration of aluminum alkoxide remains low due to its reaction as added. I have found that it is preferable to maintain the concentration of aluminum alkoxide below 0.1 molar during the reduction. With unsaturated methyl ketones the reaction temperatures should not exceed 100° C.

The subsequent hydrolysis of the aluminum alkoxide can be effected with water alone. The equation proceeds as follows:

$$(RCHOR)_3Al + 3H_2O = 3RCH(OH)R + Al(OH)_3$$

According to Lund (Ber., 70, 1520 (1927)) the isolation of the reaction product after the reduction of unsaturated ketones with aluminum isopropoxide is difficult. I have found that these unsaturated alcohols can be readily recovered from the reaction mixture by steam distillation; or, they can be diluted with about an equal volume of water and the resulting mass heated to boiling, whereupon the unsaturated alcohols separate as an oily liquid less dense than the aqueous layer. The unsaturated alcohols can be further purified by fractionation in vacuo.

The unsaturated ketones can be conveniently prepared by selectively reacting an olefin with an organic acid anhydride in the presence of catalysts, such as zinc chloride or sulfuric acid. The reactions may be represented by the following general equations:

$$C_nH_{2n} + R-CO-O-CO-R \longrightarrow C_nH_{2n-1}COR + RCOOH$$

Aliphatic olefin    Acid anhydride    Ketone    Carboxylic acid $$C_nH_{2n} + R-CO-O-CO-R \longrightarrow C_nH_{2n-3}COR + RCOOH$$

Cyclo olefin    Acid anhydride    Ketone    Carboxylic acid

In the above equations, $n$ and $m$ have the same meaning as previously given. When acetic anhydride is reacted with an olefin, a methyl ketone is formed; the complexity of the resulting product depends upon the olefin used. I have found that all the methyl ketones obtained according to the previously given method can be converted to the unsaturated alcohols, saturated alcohols, or saturated ketones when reduced by the methods previously described.

*Example 1*

Methyl octenyl ketone prepared by reaction of diisobutylene with acetic anhydride in the presence of anhydrous zinc chloride had the following properties: B. P. 93.6° C. (37 m. m. Hg), $n$ 29/C° C.=1.4480, sp. gr. 15.5/15.5° C.=0.849. 77 g. (91 ml., 0.5 mole) of this ketone were diluted with 225 ml. of absolute ethanol and reacted with hydrogen in a hydrogenation bomb at 30° C. and 300 lb./sq. in. pressure in the presence of about 5 ml. of Raney nickel catalyst until absorption of hydrogen was complete, as evidenced by the constancy of hydrogen pressure. The fractionated product possessed the following properties: B. P. 88.5–89.5° C. (37.5 m. m. Hg), $n$ 27/D° C.=1.4247, sp. gr. 15.5/15.5° C.=0.826.

Five grams of this hydrogenated ketone were condensed with semi-carbazide-hydrochloride in dilute ethanol, containing sodium acetate, giving large, colorless hard prisms of the semi-carbazone, M. P. 134–5° C. (uncorrected). This hydrogenated ketone has the following constitution:

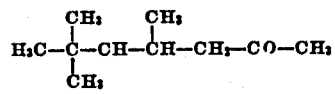

*Example 2*

Methyl octenyl ketone (77 g., 91 ml., 0.5 mole) of the same physical properties given in Example 1 was diluted with 5 ml. of Raney nickel and hydrogenated in a hydrogenation bomb at 155° C. The pressure was initially held at 715 lb./sq. in during each addition of hydrogen; the final pressure after each addition was 200 lb./sq. in. The addition of hydrogen was continued until absorption was complete. Fractionation of the resulting product gave a saturated alcohol of B. P. 91.0–94.4° C. (25 m. m. Hg), $n$ 25/D=1.4313, sp. gr.=0.8265. This saturated alcohol has the following constitution:

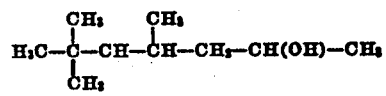

*Example 3*

Aluminum isopropoxide was prepared by refluxing a mixture of 25 g. of aluminum turnings (prepared from commercial aluminum pipe) with 300 ml. of technical 99% isopropanol (containing a small amount of mercuric chloride) until the aluminum had passed into solution. Less than 0.05 g. of mercuric chloride was used and the total heating time was eight hours. Methyl octenyl ketone (100 ml., 0.55 mole) was mixed with the previously prepared aluminum isopropoxide solution with provision being made to remove the acetone as formed by fractionation. For this a two foot column of 26 m. m. diameter packed with 0.25 inch glass helices was used. Reaction was rapid as evidenced by the production of acetone only after gentle refluxing for about five minutes. The reaction rate falls off with time. After three hours of heating, most of the isopropanol was removed by fractionation in vacuo, and the residue steam distilled giving 98 ml. of a slightly yellow liquid of characteristic odor. The fractionated unsaturated alcohol thus produced possessed a B. P.=92.0–92.5° C. (20 m. m. Hg), n 27/D=1.4418.

This unsaturated alcohol was found to absorb bromine rapidly when a dilute solution of bromine in carbon tetrachloride was added to the alcohol dissolved in the latter solvent. This unsaturated alcohol (12 g.) was refluxed for one hour with phenyl isocyanate (14 g.) and the resulting mixture was held at 150° C. for two hours. After standing over night the phenylurethane was washed free of phenyl isocyanate with ethyl ether and recrystallized from ethanol as large, rhombic, colorless crystals of m.p. 146–7° C. (uncorrected). This unsaturated alcohol is a mixture of alcohols of the following constitution:

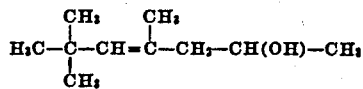

and

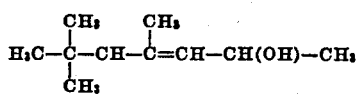

Example 4

Same as Example 3, only the aluminum isopropoxide dissolved in 500 ml. of isopropanol was added dropwise to the methyl octenyl ketone during four hours. The product was worked up as described for Example 3.

It will be understood that the foregoing description is merely illustrative of the invention, and that various changes and alternative procedures and proportions may be adopted within the scope of the appended claims, in which it is my intention to claim all novelty inherent in the invention as broadly as the prior art permits.

I claim:

1. As new chemical compounds, a mixture of unsaturated branched chain aliphatic alcohols having the following structures:

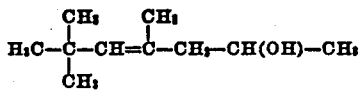

and

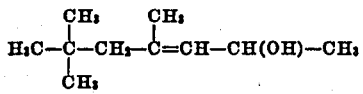

2. The process of reducing unsaturated aliphatic methyl ketones to the corresponding unsaturated alcohols which comprises adding an aluminum alkoxide dissolved in an alcohol to the unsaturated ketones in the absence of hydrogen at such a rate that the concentration of aluminum alkoxide does not exceed 0.1 molar and at a temperature below 100° C.; removing the carbonyl compound thereby formed from said aluminum compound as formed; and hydrolyzing the reaction product with water to obtain the unsaturated alcohol.

3. A process according to claim 2 in which the aluminum alkoxide is aluminum isopropoxide.

4. A process according to claim 2 in which the aluminum alkoxide is aluminum isopropoxide and the methyl ketone is methyl octenyl ketone.

5. A process for the preparation of an aliphatic unsaturated alcohol by reduction of an unsaturated methyl ketone prepared by acetylation of an aliphatic olefin containing at least three carbon atoms, which comprises adding an aluminum alkoxide dissolved in an alcohol to the unsaturated ketone in the absence of hydrogen, at such a rate that the concentration of aluminum alkoxide does not exceed 0.1 molar and at a temperature below 100° C.; removing the carbonyl compound formed from said aluminum compound as formed; and hydrolyzing the reaction product with water to obtain the unsaturated alcohol.

6. A process according to claim 5 in which the aluminum alkoxide is aluminum isopropoxide.

THOMAS F. DOUMANI.